United States Patent [19]
Wilson et al.

[11] Patent Number: 4,797,820
[45] Date of Patent: Jan. 10, 1989

[54] PROGRAMMABLE FLOW CONTROL VALVE UNIT WITH CLOCK, PROGRAM, AUTOMATIC, MANUAL, AND REPEAT MODES

[75] Inventors: Dennis A. Wilson, Wauconda Township, Lake County; Dennis W. Anesi, Rolling Meadows; Mark S. Williamsen, Evanston, all of Ill.

[73] Assignee: Ansan Industries Limited, Harwood Heights, Ill.

[21] Appl. No.: 890,170

[22] Filed: Jul. 28, 1986

[51] Int. Cl.⁴ .............................................. G05D 7/06
[52] U.S. Cl. ..................................... 364/420; 364/143; 364/510; 239/69; 137/624.13
[58] Field of Search ............... 364/509, 510, 140, 420, 364/400, 143; 137/624.11–624.22; 239/69, 70

[56] References Cited

U.S. PATENT DOCUMENTS

| | | | |
|---|---|---|---|
| 29,383 | 9/1877 | Gallatin et al. | 62/123 |
| 192,589 | 4/1962 | Katzman | D83/1 |
| 247,717 | 4/1878 | Sturman et al. | D23/38 |
| 2,817,216 | 12/1957 | Etienne | 62/123 |
| 3,097,762 | 7/1963 | Charnota et al. | 222/20 |
| 3,187,943 | 6/1965 | Wolf | 222/20 |
| 3,376,745 | 4/1968 | Davis | 73/205 |
| 3,616,820 | 2/1970 | Fleckenstein | 137/624.13 |
| 3,683,239 | 8/1972 | Sturman | 137/150 |
| 3,743,898 | 7/1973 | Sturman | 317/154 |
| 3,821,967 | 7/1974 | Sturman et al. | 137/624.15 |
| 3,872,876 | 3/1975 | Bachman | 137/118 |
| 3,912,167 | 10/1975 | Simon | 239/66 |
| 3,915,185 | 10/1975 | Sanner | 137/78 |
| 3,921,667 | 11/1975 | Corliss et al. | 137/624.15 |
| 3,978,887 | 9/1976 | Dryla | 239/70 |
| 4,012,673 | 3/1977 | Saarem et al. | 317/151 |
| 4,114,647 | 9/1978 | Sturman et al. | 239/66 |
| 4,224,530 | 9/1980 | Simcoe et al. | 307/141 |
| 4,280,530 | 7/1981 | Yi | 137/624.11 |
| 4,336,918 | 6/1982 | Karbo | 251/46 |
| 4,495,560 | 1/1985 | Sugimoto et al. | 364/154 |
| 4,506,702 | 3/1985 | Doup | 239/69 |
| 4,569,020 | 2/1986 | Snoddy et al. | 364/510 |
| 4,592,505 | 6/1986 | Bruninga et al. | 239/69 |
| 4,633,905 | 1/1987 | Wang | 137/624.11 |
| 4,646,224 | 2/1987 | Ransburg | 364/420 |

*Primary Examiner*—Jerry Smith
*Assistant Examiner*—Allen MacDonald
*Attorney, Agent, or Firm*—Mathew R. P. Perrone, Jr.

[57] ABSTRACT

A programmable flow control valve unit has a valve assembly with a solid state control cooperating with a programmable timing device to provide the operating mode for the purpose of operating the valve unit for a predetermined time period of periods in order to achieve the functioning of the valve assembly to thereby move a fluid such as a gas, a liquid, or a slurry to a particular place in a desired time pattern. The time periods may be set individually or by a repeat mode.

20 Claims, 7 Drawing Sheets

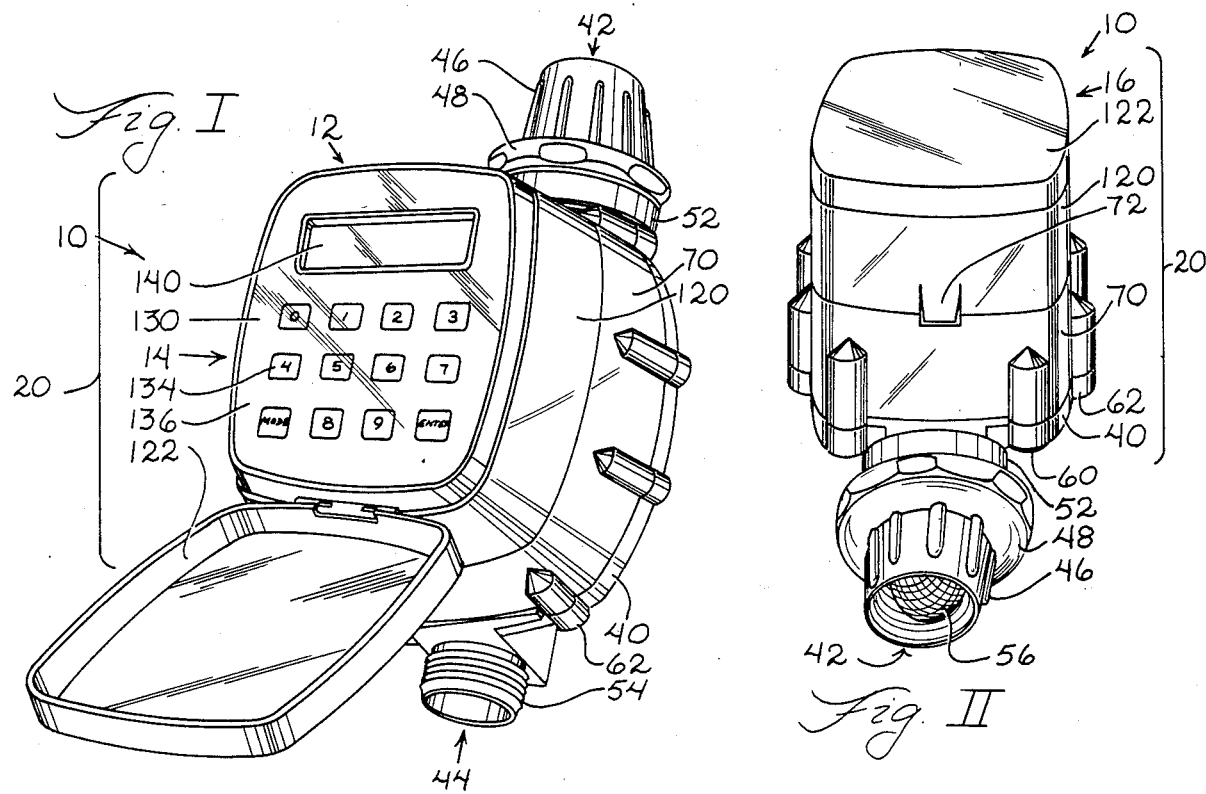
Fig. I
Fig. II
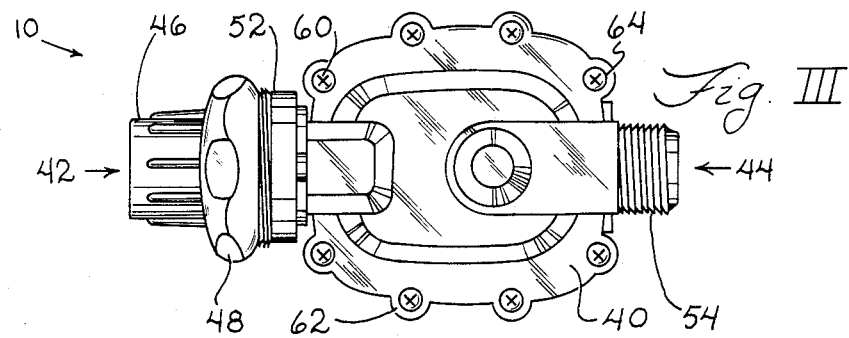
Fig. III
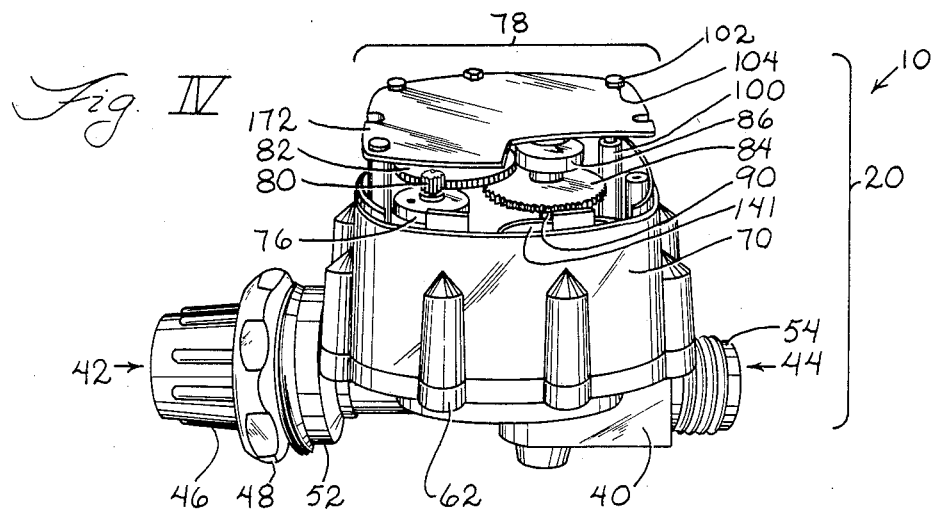
Fig. IV

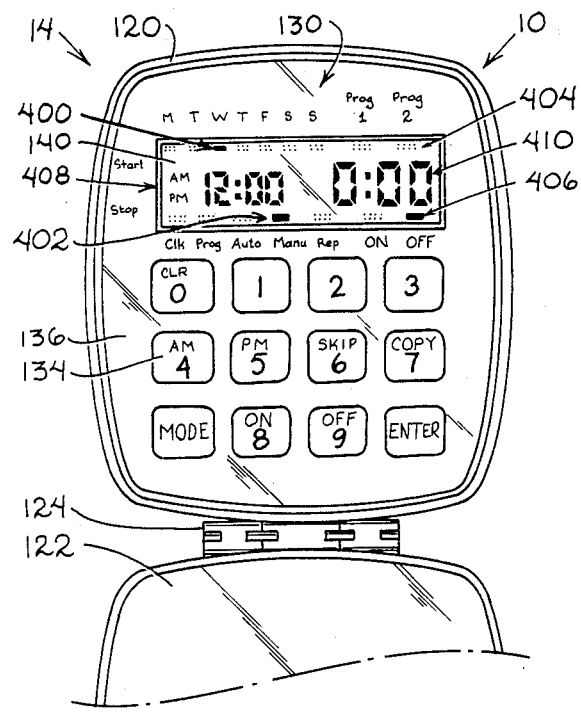
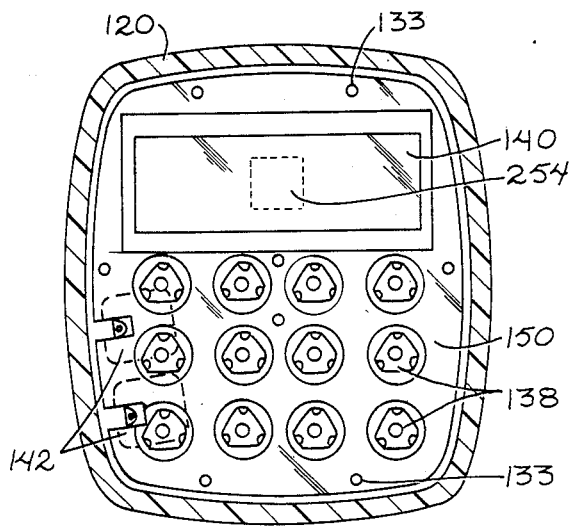
Fig. V
Fig. VI
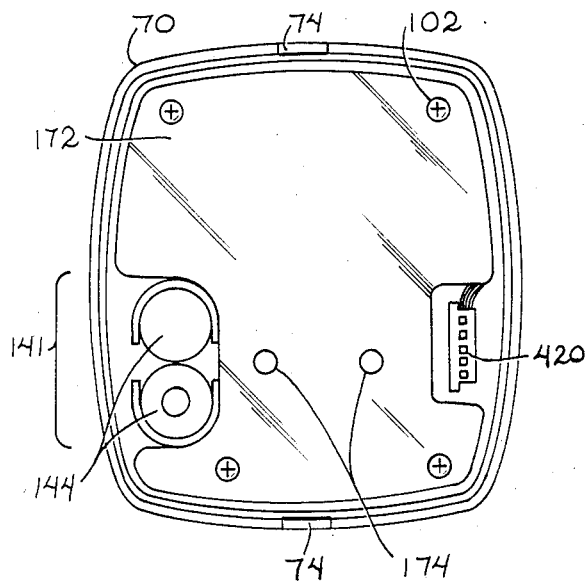
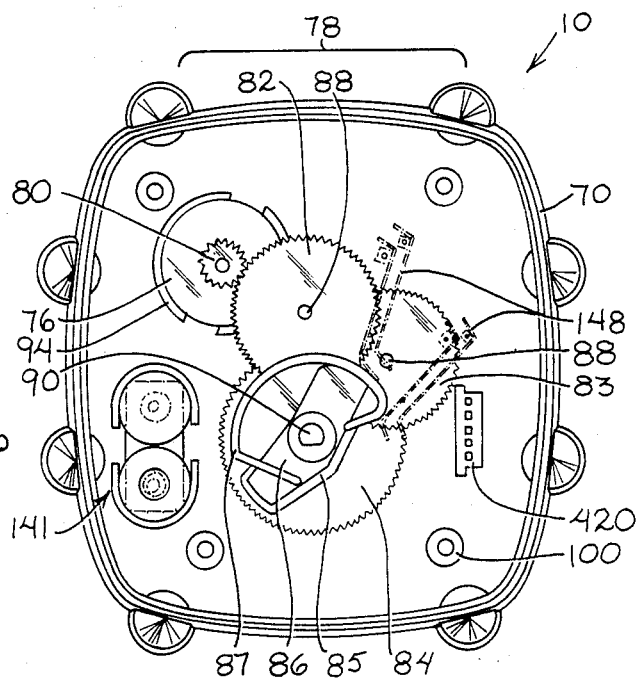
Fig. VII
Fig. VIII

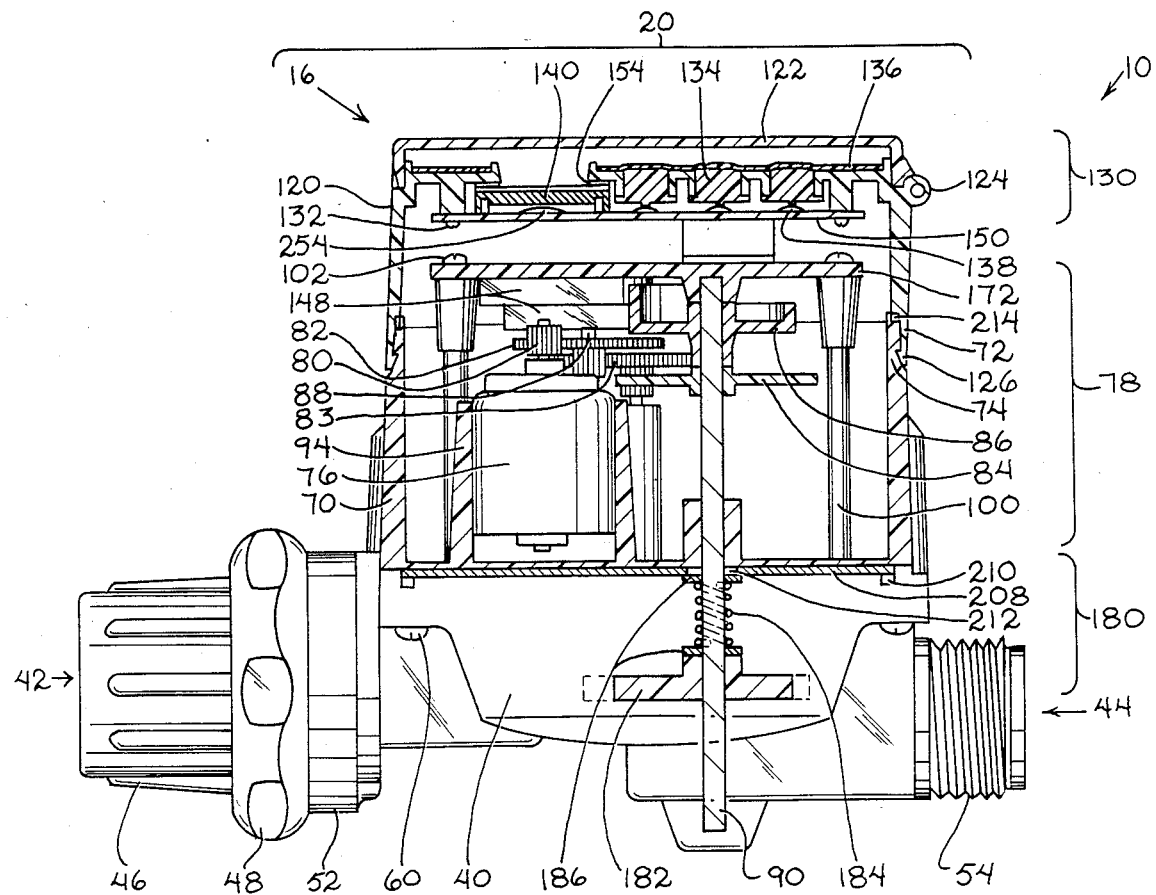
Fig. IX
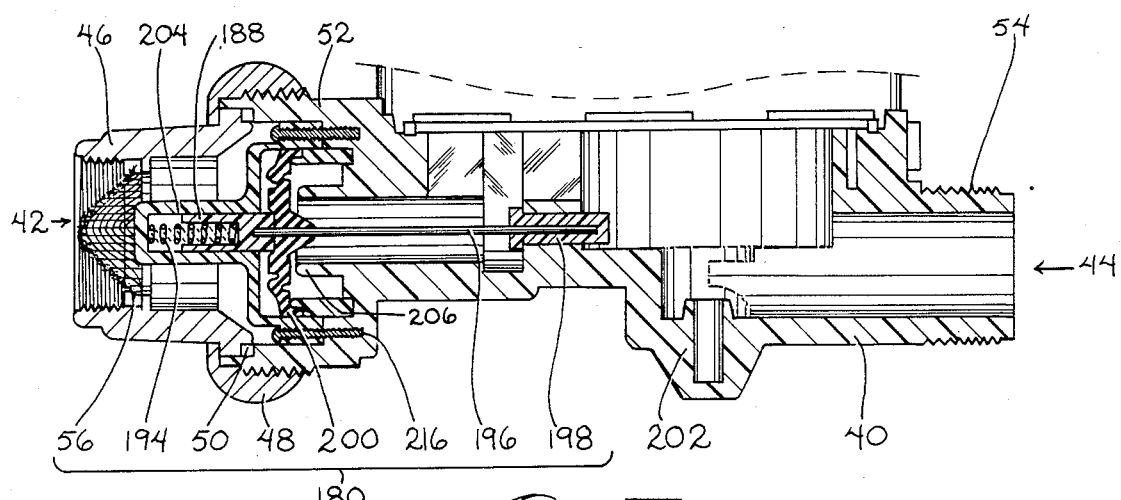
Fig. X

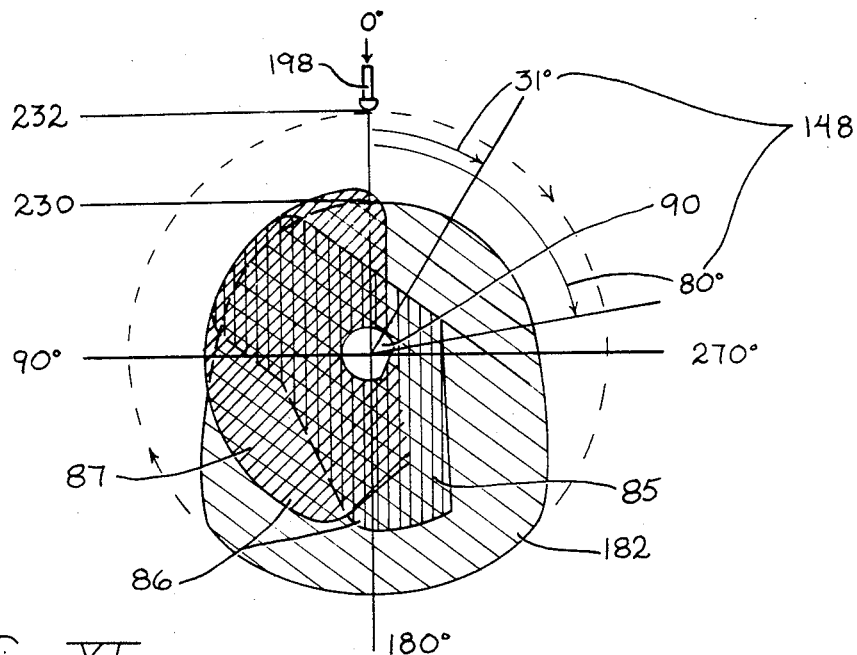
Fig. XI
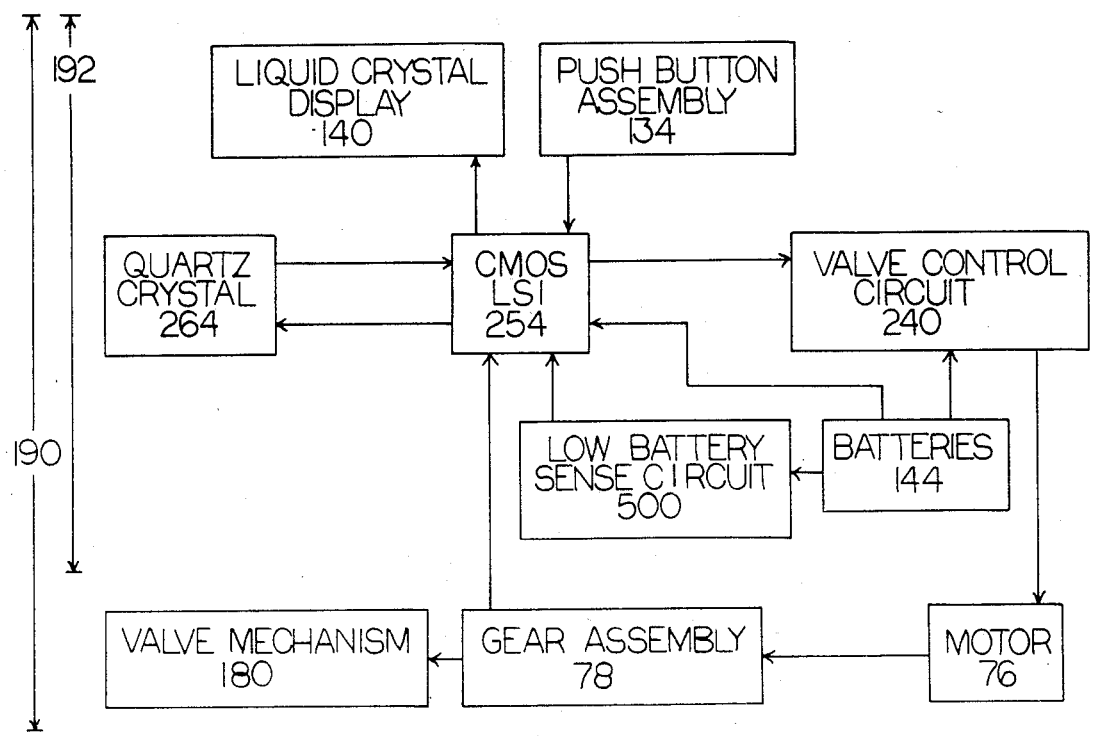
Fig. XII

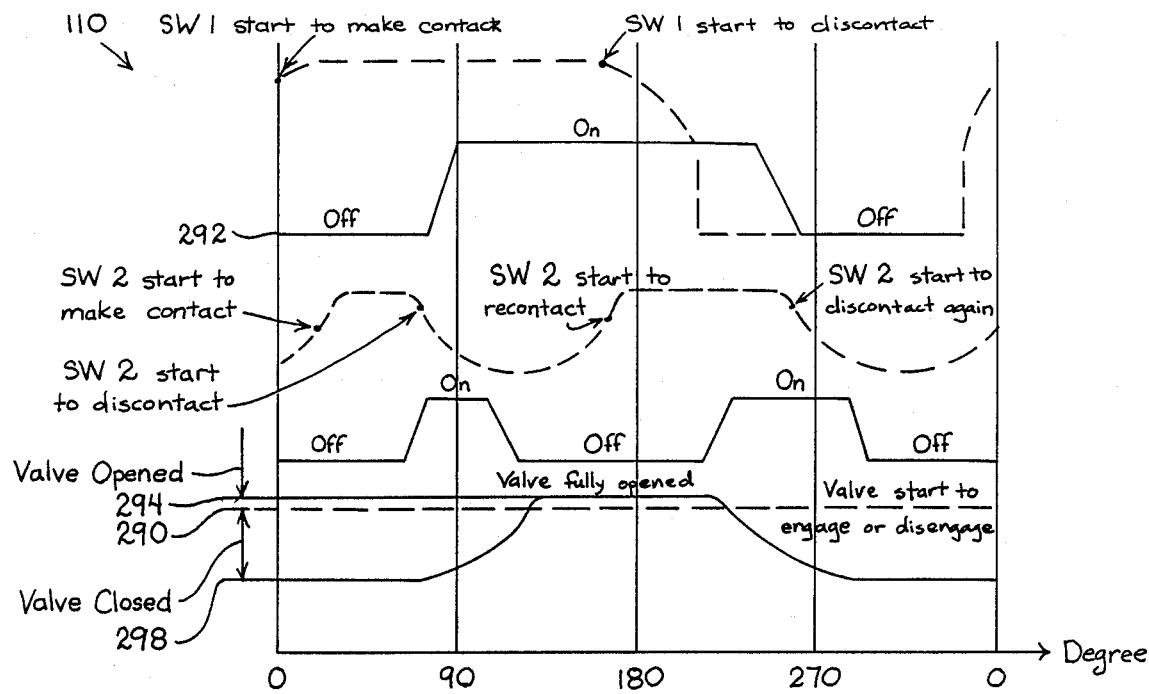
Fig. XIII
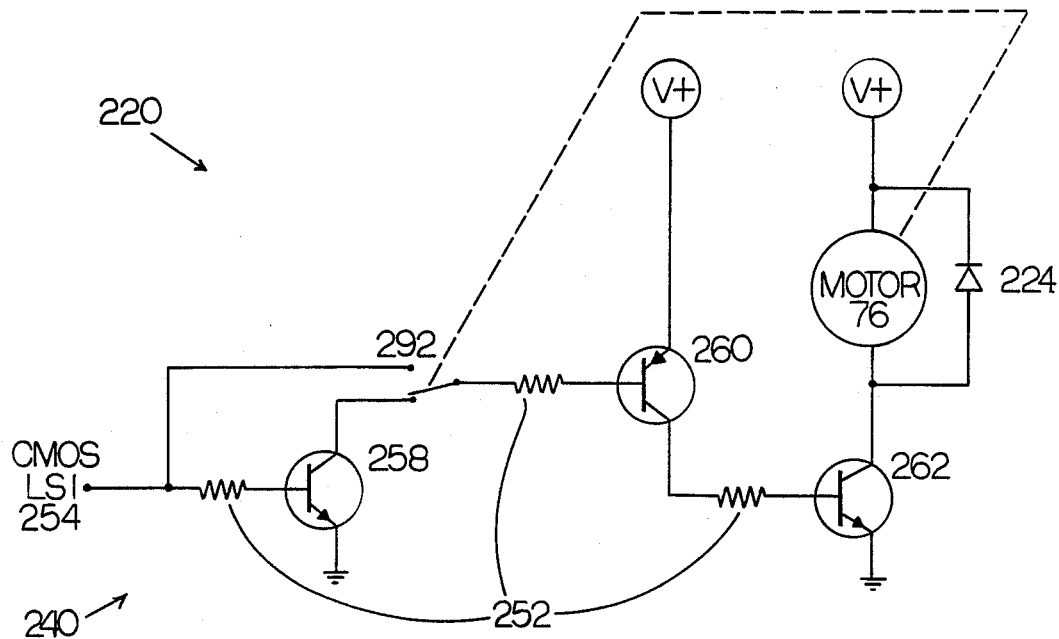
Fig. XIV

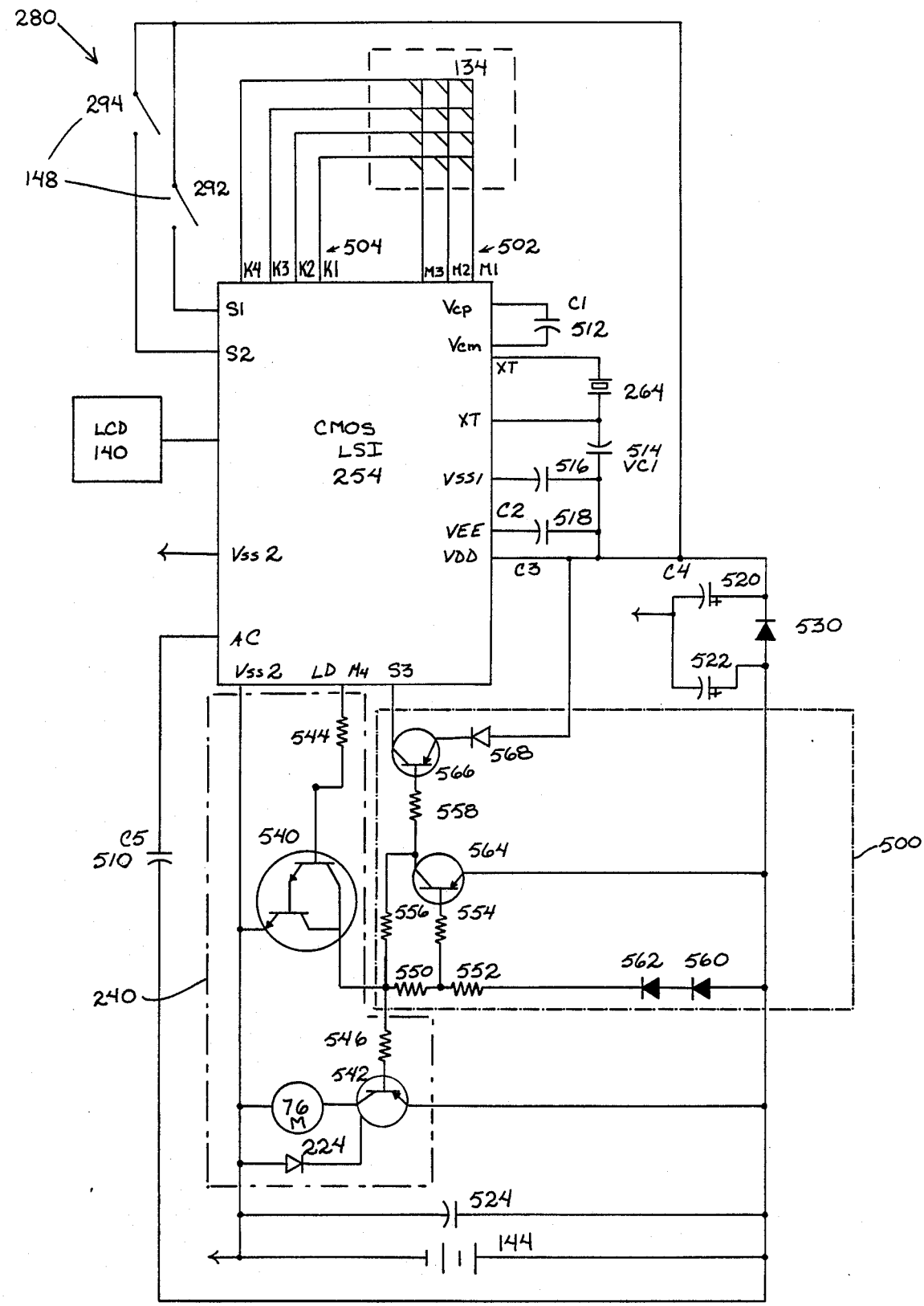
Fig. XV

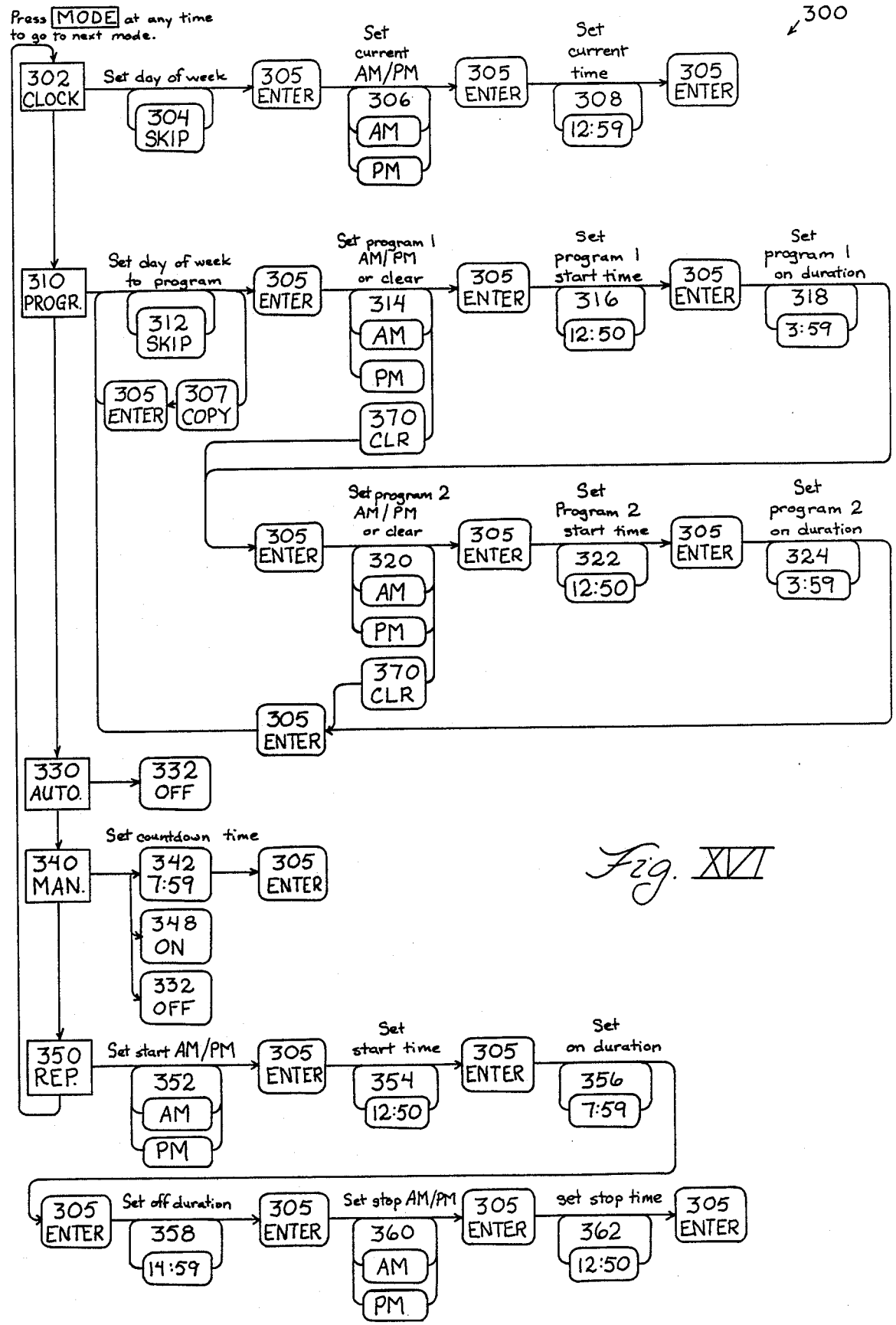
Fig. XVI

PROGRAMMABLE FLOW CONTROL VALVE UNIT WITH CLOCK, PROGRAM, AUTOMATIC, MANUAL, AND REPEAT MODES

BACKGROUND OF THE INVENTION

This invention relates to a programmable flow control valve unit and more particularly to a programmable flow control valve unit for controlling fluid flow through a system, and to control use of a fluid with respect to time. This valve unit is especially useful with a system such as a lawn sprinkler system, an irrigation system, or a domestic animal watering system.

Fluid flow control is an essential part of modern society. Fluids include gas and liquid, and may even include a slurry. A slurry is a liquid with particles dispersed therein, which permits the particles to be moved like a liquid. In fact, a slurry may be pumped through pipes to transport the particles therein efficiently and quickly.

A valve is used to direct a fluid through a pipe to desired location. It is advantageous to control the operation of a valve efficiently. Such control of a valve results in control of the fluid flow. By thus controlling fluid flow, great advantages can be obtained. There are, however, many problems with controlling a fluid flow. Additionally, a solution to one problem may magnify another problem.

The best known, most useful, most essential, and most ubiquitous liquid is water. Water is an essential element of the life process for both animals and plants. In many situations, water is not available at all times in the quantities needed. It is thus desired to provide the water in the needed amount at the needed time. This supply of water is used for lawns, farm irrigation, animal watering, or other suitable pruposes.

Such a water supply can be controlled manually. This involves having a network set up with valves to control the distribution of water to a watering system. The watering system usually includes an extensive network of pipes to carry the water and sprinkler heads to dispense the water. Such an apparatus requires a tremendous amount of manpower to achieve control thereof. Timed valves are known to reduce this manpower requirement. Typical of valve units for this purpose is the valve unit disclosed in the U.S. Pat. No. 3,473,695 to Mario Anesi. Such a liquid metering valve unit serves a great purpose.

In particular, homeowners in the desert Southwest area of the United States of America are generally required to water their lawns at frequent intervals in order to achieve the desired appearance for their lawn. Such watering procedures are best controlled by a timed watering system, which minimizes manual control of the watering, and guarantees that a proper amount of water can be applied at a proper time.

Valves known in the prior art are basically mechanical and require adjustments to achieve the desired watering times. If these adjustments can be simplified, it becomes possible to provide a more effective and more efficient valve. With this more effective and more efficient valve, the results of having the water flow set for the watering process are more easily achieved. If the valve is designed simply an economically enough with an appropriate control, such a valve may even be used to control a water system as simple as a hose and a lawn sprinkler.

A timing device in conjunction with a valve control can provide a great benefit for those people requiring that the application of water be controlled very efficiently. The timing device must cooperate with the valve so that the valve functions efficiently. The device must be sensitive to measurement of water by time of application.

The time for the valve to function to permit water flow must be adjustable to various conditions and easily set. Functions must be repeatable and easily encoded into the program of the valve. Also, a particular series of functions must be repeatable in a simple fashion in order to simplify the programming of the valve system. In this manner, the desired results may be achieved.

It is especially useful if a programmable flow control valve unit can be made simply and compactly. If the valve is simply made, it can be produced inexpensively and provide great benefit. If the valve is compact, it can easily be moved from one place to another and easily handled by the person using the valve.

It is also very suitable to have the flow control valve unit to be self-contained. If the flow control valve unit is self-contained, no additional equipment is used to achieve the desired valve functions. An additional advantage of being self-contained can be achieved by having the unit be battery operated and draw a low amount of current. If this is done, the necessity of working with electrical wiring can be avoided.

Of course, it is desirable for a flow control valve unit to have an accurate timing mechanism in order to insure the accuracy of the programmability. If the time control unit is inaccurate, the programmability is off and the desired amount of fluid cannot be applied at the desired time.

Especially critical for the flow control valve unit is that it be waterproof or water resistant. If the programmable flow control valve unit is waterproof or water resistant, it can be used with irrigation, watering of domestic animals, and other appropriate water application mechanisms.

As always, simplified inspection of a programmable flow control valve unit during production or use provides a great advantage. If the product can be inspected without substantial disassembly, great time savings and costs savings are achieved.

It is also desirable for the programmable aspects of the programmable flow control valve to be useful. Especially useful are a repeat mode, a program mode, a manual mode, and some means of indicating in which mode the unit is operating. If the unit can be switched from one mode to another during the course of use, in a simple fashion, great advantages are additionally obtained.

Since it is contemplated to use a programmable flow control valve unit in adverse conditions, it is especially useful to hermetically seal the device to keep the foreign substances out. Hermetic sealing is counter productive to a device of this type. Hermetic sealing can interfere with the desired function of the programmable flow control valve unit. Yet hermetic sealing is necessary for the function of the valve unit in the desired environment.

It is also useful if the programmable flow control valve can be portable and readily moved from place to place. Such movement permits very effective use of the valve. When this is combined with inexpensive manufacturing costs, a great advantage is obtained. One requirement of the easily moved device is that it must be installed easily and quickly without requiring special skill or special tools. Yet the wide variety of functions required of a flow control valve mitigates against simplicity.

Safety is another critical factor. Not only must the device be safe to operate, it must also be safe to install. Again, the complicated requirements for the device mitigate against such safety. It is also desirable to have a device which is versatile. With versatility, a repeat mode can be set easily. However, no device is known to have the repeating mode and the setup versatility.

Also, a variation in a mode can be required prior to being repeated. If the mode is desired to be varied and repeated, substantial structure is required. If the structure is used, the simplicity and ease of transport becomes nullified. Thus, it becomes clear that the many requirements of a programmable flow control valve are contraindicated. If one factor is amplified, another desirable factor must be reduced.

It thus becomes clear that a flexible, simply-operated device is of great use in the field of fluid flow control. This device must be reliable, easily programmed and durable. It must also be easy to install and use. As no such device is currently available, it is clearly desirable to produce such a device.

SUMMARY OF THE INVENTION

Therefore, it is an objective of this invention to provide a programmable flow control valve unit, which regulates the use of a fluid with respect to time.

A further objective of this invention is to provide a programmable flow control valve unit to simplify application of water, when water is not available at all time in quantities needed for plants and animals.

A still further objective of the invention is to provide a programmable flow control valve unit to control the inlet of water to a watering system.

Yet a further objective of the invention is to provide a programmable flow control valve unit with time settings, which can be programmed by a homeowner.

Also an objective of this invention is to provide a programmable flow control valve unit which has a simplified adjustment of watering time.

Another objective of this invention is to provide a programmable flow control valve unit having a integral timing device for efficient operation.

Yet another objective of this invention is to provide a programmable flow control valve unit which measures water applied by controlling time of application.

Still another objective of this invention is to provide a programmable flow control valve unit suitable for use with a liquid, a gas, or a slurry.

A further objective of this invention is to provide a programmable flow control valve unit having easily encoded, repeatable settings of the valve unit.

A still further objective of this invention is to provide a programmable flow control valve unit which is easily programmable.

Yet a further objective of the invention is to provide a programmable flow control valve unit which can be programmed on a day by day basis for at least a period of a week.

Also an objective of this invention is to provide a programmable flow control valve unit which is easily reprogrammed.

Another objective of this invention is to provide a programmable flow control valve unit to simplify control of fluid flow.

Yet another objective of this invention is to provide a programmable flow control valve unit to direct fluid flow.

A further objective of this invention is to provide a programmable flow control valve unit, which is self-contained.

A still further objective of the invention is to provide a programmable flow control valve unit, which is battery operated.

Yet a further objective of the invention is to provide a programmable flow control valve unit, which requires reduced battery power.

Also an objective of this invention is to provide a programmable flow control valve unit, which has an accurate timing device.

Another objective of this invention is to provide a programmable flow control valve unit, which has a dual switch cam.

Yet another objective of this invention is to provide a programmable flow control valve unit, which is waterproof.

Still another objective of this invention is to provide a programmable flow control valve unit, which is water resistant.

A further objective of this invention is to provide a programmable flow control valve unit, which can be simply inspected.

A still further objective of the invention is to provide a programmable flow control valve unit, which has a repeat mode.

Yet a further objective of the invention is to provide a programmable flow control valve unit, which has a program mode.

Also an objective of this invention is to provide a programmable flow control valve unit, which has a manual mode.

Another objective of this invention is to provide a programmable flow control valve unit, which has a flashing mode.

Yet another objective of this invention is to provide a programmable flow control valve unit, which is simple and compact.

Still another objective of this invention is to provide a programmable flow control valve unit, which can be hermetically sealed to avoid infiltration by foreign substances.

A further objective of this invention is to provide a programmable flow control valve unit, which is portable, and easily moved from place to place.

A still further objective of the invention is to provide a programmable flow control valve unit, which is inexpensive to manufacture.

Yet a further objective of the invention is to provide a programmable flow control valve unit, which is highly reliable.

Also an objective of this invention is to provide a programmable flow control valve unit, which is easily installed, without the exercise of special skills or use of special tools.

Another objective of this invention is to provide a programmable flow control valve unit, which is safe to operate and install.

Yet another objective of this invention is to provide a programmable flow control valve unit, which is versatile.

Still another objective of this invention is to provide a programmable flow control valve unit, which has various combinations of the foregoing attributes.

These and other objectives of this invention are met by providing a programmable flow control valve unit having a valve assembly with a solid state control cooperating with a programmable timing device to provide the operating mode, wherein the programmable timing device additionally provides a repeatable programming mode.

BRIEF DESCRIPTION OF THE DRAWINGS

FIG. I depicts a perspective view of the programmable flow control valve unit 10 with top cover 122 in open position 14.

FIG. II depicts an end, perspective view of programmable flow control valve unit 10 with top cover 122 in closed position 16.

FIG. III depicts a plan, bottom view of programmable flow control valve unit 10 showing base cover 40.

FIG. IV depicts a side, perspective view of programmable flow control valve unit 10 having the upper case 120 removed.

FIG. V depicts a top view of upper case 120 with keypad overlay 136 of programmable flow control valve unit 10 displayed.

FIG. VI depicts an internal view of FIG. V with upper case 120 cut away in order to show circuit board 150.

FIG. VII depicts a top view of FIG. VI with upper case 120 removed in order to show shaft cover 172.

FIG. VIII depicts a top view of FIG. VII with shaft cover 172 removed.

FIG. IX depicts a side view of FIG. II shown in partial cross-section.

FIG. X depicts a side, cross-sectional view of FIG. III.

FIG. XI depicts a top, hatched view of switch-operating cam 86 and valve cam 182 as mounted on main shaft 90.

FIG. XII depicts a block circuit diagram 190 of the electronics of the programmable flow control valve unit 10 in combination with the electrical circuit 192.

FIG. XIII depicts a graph 110 of the position of switch-operating cam 86 relative to valve cam 182.

FIG. XIV depicts a schematic 220 of the valve control circuit 240.

FIG. XV depicts a circuit digram 280 of the valve control circuit 240 in combination with the liquid crystal display 140 and the push button assembly 134.

FIG. XVI depicts an operating diagram 300 programmable flow control valve unit 10.

Throughout the figures of the drawing, where the same part appears in more than one figure, the same numeral is applied thereto.

DESCRIPTION OF THE PREFERRED EMBODIMENTS

A programmable flow control valve unit has a valve assembly connected to a solid state timing circuit for the purpose of operating the valve for a predetermined time period or periods in order to achieve the functioning of the valve in order to thereby move a fluid such as a gas, a liquid, or a slurry to a particular place in a desired time pattern. The time periods may be set individually or by a repeat mode. This programmable flow control valve unit is especially useful in the application or delivery of water to a desired area. For this reason, the programmable flow control valve unit of this invention is described with reference to water in some cases, while keeping in mind its applicability to fluids in general.

FIG. I and FIG. II

Referring now to FIG. I and FIG. II, a perspective view of the programmable flow control valve unit 10 is depicted. FIG. I depicts the programmable flow control valve unit 10 with top cover 122 in open position 14. FIG. II depicts programmable flow control valve unit 10 in closed position 16 with top cover 122 protecting the front panel assembly 130.

Programmable flow control valve unit 10 is shown with panel cover 122 in open position 14 to thereby expose front panel assembly 130. Front panel assembly 130 includes a liquid crystal display 140 with a push button assembly 134 for setting the function of the programmable flow control valve unit 10. The view in FIG. I from top 12 showing open position 14 provides a selective view of the push button assembly 134.

The housing 20 for the programmable flow control valve unit 10 includes a base cover 40 with a lower case assembly 70 connected to the base cover 40, between the base cover 40 and the upper case 120. Upper case 120 protects the electronics of the valve operation and includes panel cover 122. The lower case assembly 70 protects the gear assembly 78 and, thereby, permits the valve actuator mechanism 180 to operate.

The base cover 40, which protects valve mechanism 180, includes the fluid inlet 42 and the fluid outlet 44 with appropriate valving to achieve the desired results. Basically, fluid inlet 42 includes a female connector 46 with an inlet nut 48 for securing the female connector 46 to housing 20. Inlet nut 48 provides for a compressed holding of inlet seal ring 50 (shown in FIG. X) by the female connector 46 to the fluid inlet 42.

Base cover 40 also includes a male outlet 54 as a part of base cover 40. Base cover 40 is generally a unitary molded piece including the male outlet 54 and the female inlet support 52. Base cover 40 further includes a plurality of base cover mounts 62 being protuberances on the edge of base cover 40 and having base cover apertures 64 (shown in FIG. III) therethrough in order to permit the base cover 40 to be secured by base cover screws 60 to lower case assembly 70.

FIG. III

Referring now to FIG. III, a bottom view of base cover 40 of programmable flow control valve unit 10 is depicted. At fluid inlet 42 and fluid outlet 44 substantial structures are seen. Fluid inlet 42 includes a female connector 46 secured to a base cover inlet 52 (shown in FIG. X) by inlet nut 48. Base cover mounts 62 include base cover apertures 64 for the purposes of receiving mounting screws 60 to provide the holding mechanism for base cover 40 to be secured to lower case assembly 70.

FIG. IV

Referring now to FIG. IV, a side, perspective view of programmable flow control valve unit 10 having the upper case 120 removed is shown. Such removal permits a view into lower case assembly 70 to show gear assembly 78. Lower case assembly 70 provides protection for gear assembly 78. Lower case assembly 70 includes a shaft cover 172 and shaft cover screws 102 for main shaft 90 and motor 76.

Motor 76 forms an integral part of gear assembly 78 by providing motor pinion 80 secured to and driven by the motor 76. Motor pinion 80 drives a first reduction gear 82 to slow down the speed of the motor 76 and provide the necessary operation for the first reduction gear 82. The first reduction gear 82 slows the speed of the motor 76 and is in toothed relation with second reduction gear 83 (shown in FIG. IX) to permit proper function of the programmable flow control valve unit 10.

Valve gear 84 cooperates with, or is operably connected to, second reduction gear 83 and controls the functioning of the programmable flow control valve unit 10 through main shaft 90. The valve gear 84 controls the function of the programmable flow control unit valve 10 by integrating with cam 86 to adjust the programmable flow control valve unit 10 as is properly fit for the proper water flow for the desired period of time. Cam 86 is secured to main shaft 90. Main shaft 90 operates in conjunction with the valve actuator 180 (FIG. X) to modulate fluid flow in the programmable flow control valve unit 10.

Shaft cover 172 is supported by shaft cover mounts 100. Shaft cover mounts 100 are molded into and form an integral part of lower case assembly 70. Shaft cover mounts 100 protrude upwardly therefrom to support shaft cover 172 in place. Shaft cover screws 102 pass through shaft cover apertures 104 in shaft cover 172 into threaded relation with shaft cover mounts 100 to hold shaft cover 172 in place. Generally, four of shaft cover mounts 100 are used.

FIG. V

Referring now to FIG. V, a top view of programmable fluid flow control valve 10 in open position 14 is depicted. Top cover 122 is shown as connected to upper case 120 by cover pivot hinges 124. Cover 122 is shown only in part.

By considering FIG. V, the front panel assembly 130 is depicted. The front panel assembly 130 includes a liquid crystal display 140 and a push button assembly 134 covered by a keypad overlay 136. The push button assembly 134 is provided with ten numeric keys and two command keys. The command keys set the mode of push button assembly 134. The numeric keys allow direct numeric entry of program parameters. Thus, a keyboard and digital readout are depicted for use in the electronic programmable fluid flow control valve 10 of this invention.

A liquid crystal display 140 provides a readout of the instructions given by activation of push button assembly 134. The liquid crystal display 140 presents program data and status information to the user, as directed by the single chip microcomputer 254. Visible in the display 140 are the day of the week 400, operating mode 402, first or second program indication 404, valve on or off indication 406, time of day 408 (including AM/PM, hours, and minutes). Also displayable is a time duration 410, for which programmable flow control valve unit 10 permits fluid to flow therethrough (including hours and minutes).

Each area of the display 140 shows data or status information appropriate to the current mode of operation. Operating mode indication 402 always shows the current mode in which the programmable fluid flow control valve 10 is operating. Additionally, when user input is expected, the item to be set flashes in the display 140 to prompt the user.

FIG. VI

Referring now to FIG. VI, basically a top view of FIG. V with upper case 120 cut away, printed circuit board 150 is depicted. In this fashion the circuit board mounting apparatus 133 for mounting the circuit board 150 in the upper case 120 are decpited. Battery contacts 142 are shown as being in proper position on underside of circuit board 150 to carry current from the batteries 144 to the circuit board 150.

Additionally shown is the mounting of the CMOS LSI (complementary metal oxide silicon large scale integration) single chip microcomputer 254 on the circuit board 150 beneath the display 140 for carrying out the functions of the valve 10. Dome contact switches 138 are mounted on top of the circuit board 150 allowing the user to input commands and program data to the microcomputer 254. These dome switches 138 are designed to offer a non-linear force versus displacement characteristic providing "tactile feedback" to the user. Thus, the user has both a sight and a feel for information entered, which combine to provide reassurance to the user.

Other components mounted on the underside of the circuit board 150 (not shown) are the 32,768 Hertz timekeeping reference crystal 264, first transistor 258, second transistor 260, third transistor 262, and 5-pin plug 422 which carries current to the DC motor 76 and which receives signals from the main shaft position sense leaf switches 148.

Mounting of the components herein is achieved by using an appropriate adhesive, a standard soldering method or other suitable means. The adhesive may be an epoxy based substance on any substance compatible with both the electronic capabilities and the fluid handling capabilities of the programmable fluid flow control valve 10. Soldering methods, as used herein, are conventional. Electrical connections therebetween (where the electrical connections are more than the standard electrical connections) are clearly explained in the discussion of FIG. XIV and FIG. XV.

FIG. VII

In FIG. VII, upper case assembly 120 is removed to depict the gear assembly 78 as covered by the shaft cover 172. With the upper case assembly 120 removed, shaft cover 172 is exposed. then, batteries 144 in battery assembly 141 become visible. Shaft cover 172 is held in place by shaft cover screws 102 threadably engaging shaft cover mounts 100.

Shaft cover 172 further includes inspection apertures 174. Inspection apertures 174 allow easy inspection of switch cam 86 position, which may be observed to determine correct operation of the programmable fluid flow control valve 10. A 5-pin receptacle 420 is shown nested into a recess in shaft cover 172, carrying current to the DC motor 76 and signals from the leaf switches 148.

FIG. VIII

Removal of shaft cover 172 provides a top view of gear assembly 78. This is shown in FIG. VIII. The appropriate shafts are mounted in the base of the lower case assembly 70. Appropriate supports are within the case to support each items in the case. From this top view, motor 76 can be seen as operably connected to leaf switches 148 through first reduction gear 82, second reduction gear 83, valve gear 84, and switch cam 86.

Motor 76 includes motor pinion 80 in toothed contact with reduction gear 82. First reduction gear 82 and second reduction gear 83 serve the purpose of driving the main shaft 90 at a lower rotational speed than that of the motor 76, while at the same time reducing the torque loading on the motor 76. Since current in the motor 76 is proportional to torque loading, this also reduces operating current for the programmable fluid flow control valve unit 10.

First reduction gear 82 and second reduction gear 83 are held in position by gear shafts 88. Gear shafts 88 are interchangeable and mounted in housing 20 in a standard fashion. Motor pinion 80 drives first reduction gear 82 which drives second reduction gear 83, which in turn drives main shaft gear 84 which is mounted on main shaft 90. Main shaft 90 is flattened, as is the center aperture of shaft gear 84, so that the shaft 90 and gear 84 turn together in the same relationship.

Also mounted on the main shaft 90 are a valve cam 182 (shown more clearly in FIG. IX) and a switch cam 86. These elements are also flattened to maintain a known relationship between the valve cam 182 and the switch cam 86, and the shaft 90. The switch cam 86 operates two leaf switches 148 so that the single chip microcomputer 254 can monitor the position of the main shaft 90 and associated valve cam 182.

Valve cam 182 is generally of a flattened elliptical shape. Movement of or rotation of valve cam 182 as main shaft 90 rotates opens or closes valve actuator mechanism 180, and permits water or other fluid to flow or not to flow through the programmable fluid flow control valve unit 10, as desired.

The switch cam 86 is generally of a flatened mushroom shape. Such a mushroom shape has a lower stem portion 85 and an upper semi-circle portion 87. This configuration permits operation of leaf switches 148 in efficient, reliable and durable manner.

FIG. IX

Referring now to FIG. IX, a partial cross-section of a side view of programmable fluid flow control valve 10 is depicted. In particular, emphasis is placed on a side view of the front panel assembly 130 and of the gear assembly 78. Shaft cover 172 is shown as having a position between the gear assembly 78 and the front panel assembly 130. In this fashion, the gear assembly 78 and the front panel 130 are supported and separated. Motor 76 is shown as secured in motor housing 94. Motor housing 94 is on the lower case assembly 70. Motor housing 94 is generally shaped to receive electric motor 76. In this fashion, electric motor 76 is supported within lower case assembly 70.

Motor pinion 80 is operably connected to motor 76. Motor pinion 80 contacts first reduction gear 82 in toothed relationship to provide reduction for the speed of the motor to thereby permit the valve actuator mechanism 180 to be operated. In this fashion, the programmable fluid flow control valve 10 controls the flow of a fluid. First reduction gear 82 contacts valve gear 84 through second reduction gear 83. Valve gear 84 operates the opening and the closing of the valve actuator mechanism 180 by being in combination with valve cam 182 on shaft 90.

Also a pair of case clips 72 are shown as securing lower case assembly 70 and upper case 120 together. Case clips 72 are oppositely disposed from each other and symmetrical. One clip 72 is adjacent male outlet 54. The other clip 72 is adjacent fluid inlet 42. Clip 72 includes a female receiver 74 within lower case assembly 70. Female receiver 74 cooperates with male gripper 126 to hold lower case assembly 70 and upper case 120 together. Upper case gasket 214 seals the joint thus formed and prevents leakage therethrough. Lower case assembly 70 and upper case 120 are shaped to receive clips 72 and fit tightly together.

Electronic functions of the programmable fluid flow control valve 10 are carried out in the front panel assembly 130, with top cover 122 thereover. Circuit board screws 132 hold the circuit board 150 in position in the front panel assembly 130. The push button assembly 134 is electrically connected to single chip microcomputer 254 which is also connected to the liquid crystal display 140, the motor 76, the leaf switches 148, and the batteries 144 shown in FIG. XII.

The keypad overlay 136 provides coverage for the front panel assembly 130 and push button assembly 134. The keypad overlay 136 is embossed above each member of push botton assembly 134 to reduce actuating force and improve the feel thereof. The dome contact switches 138 are the items, by which, the push button assembly 134 activates and programs the programmable fluid flow control valve 10. The switch cam 86 operates the leaf switches 148 in order to signal valve position to the microcomputer 254.

Beneath the lower case assembly 70 in base cover 40 and mounted on shaft 90 are the valve cam 182, a washer 186, a spring 184, another washer 186, and an "O"-ring 212 in that sequence. A metal platform 208 through which shaft 90 passes is sealed to the base cover 40 by base cover gasket 210. The spring 184 pushes outward against the washers 186 to hold the "O"-ring 212 against the metal platform 208 making a fluid tight seal within the base cover 40. The metal platform 208 significantly increases the strength and rigidity of the assembly to prevent excess deformation when fluid pressure is applied during use of the programmable fluid flow control valve 10.

Between the upper case 120 and the liquid crystal display 140 is display gasket 154. Between the upper case 120 and the lower case 70 is the upper case gasket 214. These gaskets protect the front panel assembly 130 including circuit board 150 from moisture penetration.

FIG. X

Referring now to FIG. X, a partial cross-section of base cover 40 is disclosed. This cross-section construction is more clearly disclosed in U.S. Pat. No. 3,473,695 to Anesi—said patent being incorporated herein by reference. Spring sleeve 188 includes a pilot spring 194 protected by an inlet cover 204 secured to base cover 40. Pilot shaft 196 provides connection between spring sleeve 188 and cam follower 198 to permit functioning of the fluid valve 10 of this invention.

Diaphragm 200 modulates fluid flow by moving toward or away from annular valve seat 206 as directed by spring sleeve 188. Within base cover 40 is shaft receiver 202 for the purpose of supporting one end of shaft 90. Shaft 90 is supported at the other end thereof by shaft cover 172.

The operation of the programmable fluid flow control valve 10 thus becomes clear. A fluid passing through the programmable fluid flow control valve 10 passes into the female connection 46, through the filter screen washer 56, past the inlet cover 204, into the base cover inlet 52, between the valve diaphragm 200 and the valve seat 206, between the base cover 40 and metal platform 208, other the valve cam 182, and through the male outlet 54.

FIG. XI

In FIG. XI, the relative positions of mushroom-shaped cam 86 with lower stem portion 85 and upper semicircular portion 87, and valve cam 182 are shown. As main shaft 90 is rotated by the motor 76 and gear assembly 78, the valve cam 182 also rotates causing the cam follower 198 to move away from shaft 90 to the open valve position 232, then towards shaft 90 to the closed valve position 230. The switch cam 86 also rotates on shaft 90, operating the leaf switches 148.

To open or close the programmable fluid flow control valve 10, the microcomputer 254 applies current to motor 76, causing shaft 90 with switch cam 86 and valve cam 182 to rotate, until leaf switches 148 signal that the desired valve position has been achieved. Linear plots of the cam profiles of switch cam 86 and valve cam 182 are shown in FIG. XIII.

FIG. XII

Referring now to FIG. XII, a block diagram 190 is depicted. The effect of this block diagram 190 is to show the interrelation of the electronic circuitry and the mechanical aspects of programmable fluid flow control valve 10. Basically, the electronic circuit 192 includes a single chip microcomputer 254, which carries out all logic and timing functions; a pushbutton assembly 134, which allows user input of data and commands; a liquid crystal display 140, which presents valve status and program data to the user; a 32,768 Hertz timekeeping crystal 264; a valve control circuit 240, which the microcomputer 254 uses to apply current to the motor 76; and batteries 144, which supply all power needed by the programmable fluid flow control valve 10.

A low battery sensing circuit 500, which signals the microcomputer 253 when batteries 144 have reached the end of their operating life, is also included in the electronic circuit 192. Battery sensing circuit 500 prevents opening or or use of the programmable flow control valve 10 open when batteries 144 lack the power to support subsequent valve closing instructions. Thus, the programmable flow control valve 10 cannot be locked into an open position.

When current is applied, the motor 76 runs, rotating gear assembly 78 which operates valve mechanism 180. An electrical connection from the gear assembly 78 back to the microcompuer 254 signals when the programmable fluid flow control valve 10 reaches the desired position so that the microcomputer 254 may cease application of current to the motor 76. Thus, the desired functions are achieved.

FIG. XIII

Referring now to FIG. XIII, the profiles of valve cam 182 and switch cam 86 are plotted through one 360° revolution of main shaft 90. Also plotted is the status of the leaf switches 148, shown as first switch 292 and second switch 294. Trace 298 shows the relative position of cam follower 198 as it moves in response to rotation of valve cam 182. When the trace is above threshold 290, the valve mechanism 180 of the programmable fluid flow control valve unit 10 is considered open. As shown in FIG. XIII, the valve mechanism 180 of the programmable fluid flow control valve unit 10 is closed at 0° (or 360°) and open at 180° main shaft rotation.

To open the programmable flow control valve unit 10 from a closed position (0°), the microcomputer 254 applies current to the motor 76 until first valve position sense switch 292 is closed indicating approach to open position, and second valve position sense switch 294 is open indicating correct rotation of shaft 90 to cease application of current. The motor 76 coasts briefly leaving the shaft 90 at 180° position with valve open.

To close the valve from an open position (180°) the microcomputer 254 applies current to the motor 76 until first switch 292 is open indicating approach to closed position, and second switch 294 is open indicating correct rotation of shaft 90 to cease application of current. The motor 76 again coasts briefly, this time leaving the shaft 90 at 360° position with valve closed. By stopping the motor 76 on the same edge (switch opening) of second switch 294, greater accuracy of shaft position is achieved than if both opening and closing edges of a single switch were used.

FIG. XIV

FIG. XIV shows a schematic diagram 220 of a simple valve control circuit using one single pole double throw switch to sense valve position. The cam profile for this switch is that of first valve position sense switch 292 in FIG. XIII. In FIG. XIV, first transistor 258, second transistor 260, and third transistor 262 operate with switch 292 to control motor 76 as directed by a control signal received from the microcomputer 254. First transistor 258 operates as an inverter which is switched in or out of the circuit by valve position sense switch 292. Each of the transistors has a resistor 252 connected in series with its base to set the transistor's input current.

To open the valve from the closed position (0°) the microcomputer 254 applies a high logic level (close to positive supply voltage) to the base resistor 252 of the first transistor 258. This signal is amplified and inverted by first transistor 258, causing current to flow through switch 292 and base resistor 252 of second transistor 260 resulting in application of current to motor 76. Motor 76 then runs, turning main shaft 90 until first switch 292 changes state causing second transistor 260 to receive a high logic level, which in turn ceases application of current to motor 76. A momentary voltage spike is generated in the motor 76 when current ceases. This spike is absorbed by spike suppression diode 224.

To close the valve actuator mechanism 180 from an open position (180°), the microcomputer 254 applies a low logic level (close to negative supply voltage) to the base resistor 252 of the second transistor 260 through first switch 292. This causes current to be applied to motor 76 which runs, turning shaft 90, until first switch 292 changes state causing second transistor 260 to receive a high logic level from first transistor 258, causing the motor 76 to stop.

FIG. XV

FIG. XV shows a complete schematic circuit diagram 280 of programmable fluid flow control valve 10. Main circuit blocks are the pushbutton switch assembly 134, single chip microcomputer 254, liquid crystal display 140, batteries 144, leaf switches 148, valve control circuit 240, and low battery sensing circuit 500.

Pushbutton switch assembly 134 forms a switch matrix connecting keyboard drive lines 502 to keyboard sense lines 504 allowing the microcomputer 254 to sense closure of any pushbutton switch in push button switch assembly 134.

Leaf switches 148 consist of first switch 292 and second switch 294, both operated by switch cam 86. The leaf switches 148 operate to signal the microcomputer 254 when the main shaft 90 has reached the desired position, as described in FIG. XIII. Liquid crystal display 140 is driven directly by microcomputer 254 to display information to the user as described in FIG. V.

First signal capacitor 510, second signal capacitor 512, third signal capacitor 514, fourth signal capacitor 516 and fifth signal capacitor 518 are required for various signals internal to the microcomputer 254. First filter capacitor 520, second filter capacitor 522 and third filter capacitor 524 provide power supply filtering.

Diode 530 prevents the positive supply voltage at the microcomputer 254 from dropping when the batteries 144 are loaded momentarily by the motor 76.

Valve control circuit 240 enables or disables current to the motor 76 depending on the logic level received from the microcomputer 254. A high logic level applied by the microcomputer 254 to first darlington transistor 540 through first base resistor 544 causes first transistor 540 to conduct a current through second transistor 542 by way of second base resistor 546.

This in turn causes current to flow in the motor 76, effecting a change in state of the programmable fluid flow control valve 10. A low logic level applied by the microcomputer 254 to first transistor 540 causes it and second transistor 542 to be cut off, ceasing application of current to the motor 76. A momentary voltage spike is generated in the motor when current ceases. This spike is absorbed by spike suppression diode 224.

In addition to applying current to the motor 76, valve control circuit first transistor 540 also enables the low batery sensing circuit 500. The low battery sensing circuit 500 prevents operation of valve actuator mechanism 180 if the batteries 144 have a charge below a certain level.

The low battery sensing circuit 500, thus causes current to flow in first resistor 550, second resistor 552, third resistor 554, fourth resistor 556, fifth resistor 558, and in first germanium diode 560 and second germanium diode 562. First resistor 550 and second resistor 552 with first germanium diode 560 and second germanium diode 562 form a voltage divider which applies a voltage to low battery sensing circuit 500 and first transistor 564 through base resistor 554. This voltage is proportional to the supply voltage of batteries 144.

First germanium diode 560 and second germanium diode 562 exhibit a forward voltage temperature coefficient which is complementary to that of first transistor 564 resulting in a low battery sensing threshold which is stable with respect to variations in ambient temperature. Second transistor 566 amplifies and inverts the signal from first transistor 564 and applies it to the microcomputer 254. Diode 568 in series with transistor 566 inserts a voltage drop which shifts the output voltage of transistor 566 to a level appropriate to the microcomputer 254. In this manner, the microcomputer 254 can determine when the batteries 144 have reached the end of their operating life.

Quartz crystal 264 operates with microcomputer 254 to generate a timekeeping reference frequency of 32,768 cycles per second (2 raised to the 15th power cycles per second). This reference frequency is then divided down to other lower frequencies which are used by the microcomputer 254 to carry out its valve control and logic functions. By using a relatively slow frequency such as 32,768 Hertz for the master clock of the single chip microcomputer 254, power consumption of the single chip microcomputer 254 is kept extremely low, while still providing good response time to user input.

FIG. XVI

FIG. XVI is an operating diagram 300 of the steps used to set up the programmable fluid flow control valve 10 to perform its desired function in the preferred fashion. Shown are the five operating modes which are coded into the control logic of the single chip microcomputer 254. These are the clock mode 302, program mode 310, automatic mode 330, manual mode 340, and repeat mode 350. Each mode allows the user to enter by using the push button assembly 134 different commands and data which are relevant to that mode. Each mode causes to be shown different status and program information on liquid crystal display 140 which is relevant to that mode.

Clock mode 302 allows the user to enter the current day of the week 304, current AM or PM status 306, and the current time 308. The "ENTER" command 305 is used after each data item to load it into the appropriate register within the microcomputer 254.

In program mode 310, the user first selects which day of the week to program 312. Then, the user sets program 1 AM/PM 314, program 1 start time 316, program 1 on duration 318, program 2 AM/PM 320, program 2 start time 322, and program 2 on duration 324. When selecting which day 312, the user may also copy 307 a previously entered program to the selected day.

When setting AM/PM 314, the user may also clear 370 program 1. When setting AM/PM 320, the user may also clear 370 program 2. After setting programs 1 and 2, the programmable fluid flow control valve 10 remains in program mode 310 so that the user may select other days 312 for programming.

In automatic mode 330, the programmable fluid control valve carries out the fluid flow sequence entered in program mode 310. The sequence is repeated every week until interrupted by the user or a low battery condition. In automatic mode 330 the user may enter an OFF command 332, closing the programmable fluid flow control valve 10 until the next programmed ON time.

Manual mode 340 lets the user begin immediately a one-shot timed fluid flow cycle by entering a countdown time 342. Alternatively, the user may also set the valve 10 to an open or closed state until further command.

Repeat mode 350 accepts six different parameters from the user and then begins a fluid flow cycle which repeats daily until interrupted by the user or low battery. The parameters entered are repeat mode start AM/PM 352, start time 354, on duration 356, off duration 358, stop AM/PM 360, and stop time 362. Repeat mode 350 permits program mode 310 to be repeated in a simple fashion.

With this combination of desired features, great advantages are obtained. Desired patterns of watering may be set reliably and efficiently. Any suitable materials may be used to make the programmable flow control valve unit 10. The materials must be durable and capable of performing under the desired conditions. Such materials are commercially available. The programmable flow control valve unit 10 of this invention performs its functions reliably and efficiently.

Because of this disclosure and solely because of this disclosure, certain modifications of this particular programmable flow control valve unit closure will become apparent to those having ordinary skill in this art. Such modifications are clearly covered hereby.

What is claimed and sought to be secured by letters Patent of the United States is:

1. A programmable flow control valve unit for directing the flow of a fluid, said valve unit including a valve assembly operably connected to an electronic assembly, wherein:
   a. said electronic assembly includes a sequence type control with a programmable memory means operably connected to a means for accepting cycle selections by a user of said programmable flow control valve unit;
   b. said sequence type control includes a selected program for activating said electronic assembly and thereby operate said valve assembly;
   c. said selected program includes at least one discrete program advancing operation;
   d. said discrete program advancing operation is dependent, at least in part, upon said cycle selections;
   e. said electronic assembly further includes a copying means for duplicating said discrete program advancing operation to permit said selected program to have easily duplicated parts;
   f. said electronic assembly further includes a display means operably interconnected with said electronic assembly for providing an indication of instructions given to said programmable flow control valve unit;
   g. said electronic assembly further includes a clock means operably interconnected with said electronic assembly for timing said operations; and
   h. said electronic assembly further includes a control logic means operable during a programmable mode operably connected to said electronic assembly in order to enable the electronic assembly to function;
   i. said sequence-type control is a push button assembly operably connected to said discrete program advancing operation for setting a set of five modes including a clock mode, a program mode, an automatic mode, a manual mode, and a repeat mode;
   j. an enter means is operably connected for loading each of said five modes within said discrete program advancing operation;
   k. said clock mode provides a day readout and a time of day readout within said display means; and
   l. said display means provides a program readout for said discrete program advancing operation and a clock mode readout for said clock mode at the same time.

2. The programmable flow control valve unit of claim 1, wherein:
   a. said electronic assembly includes a printed circuit board connected therein;
   b. said printed circuit board has battery contacts, a microcomputer, a timing device, and a means for sensing interconnected with said printed circuit board;
   c. said battery contacts are on an underside of said printed circuit board;
   d. said timing device is mounted on said underside;
   e. said sensing means for sensing a position of a main shaft of said programmable flow control valve unit;
   f. said battery contacts receive power from a battery means for providing power to said device for said microcomputer, said timing device, and said sensing means;
   g. said microcomputer includes a programmable memory means for said valve unit;
   h. said push botton assembly is operably connected to said microcomputer for setting said set of five modes including said clock mode, said program mode, said automatic mode, said manual mode, and said repeat mode; and
   i. an enter means is operably connected for loading each of said five modes within said microcomputer.

3. The programmable flow control valve unit of claim 2, wherein:
   a. said electronic assembly includes a push button assembly electrically connected to said microcomputer;
   b. said push button assembly is electrically connected to said display means, an electric motor, a switching means and a power source;
   c. said microcomputer carries out all logic and timing functions of said programmable flow control valve unit;
   d. said electronic assembly includes a valve control circuit for said microcomputer for applying current to said motor; and
   e. said electronic assembly includes a low battery sensing circuit for signaling said microcomputer to keep said valve unit closed when said battery means used to supply power to said programmable flow control valve unit have reached the end of their operating life.

4. The programmable flow control valve unit of claim 3, wherein:
   a. said switch means includes a first switch and a second switch operated by a switch cam;
   b. said push button assembly forms a switch matrix connecting keyboard drive lines to keyboard sense lines thereby allowing said microcomputer to sense closure of any member in said push button switch assembly;
   c. said display means in a liquid crystal display driven directly by said microcmputer; and
   d. said timing device includes a quartz crystal.

5. The programmable flow control valve unit of claim 4, wherein:
   a. said microcomputer has five operating modes;
   b. said operating modes includes a clock mode, a program mode, an automatic mode, a manual mode, and a repeat mode; and
   c. said operating modes are operably connected to said push button assembly.

6. The programmable flow control valve unit of claim 5, wherein:
   a. said clock mode allows entry of the day of the week, time status, and the current time;
   b. said program mode provides a means to select a day of the week to program, a start time, and a duration time;
   c. said start time provides a time for said valve assembly to be opened; and
   d. said duration time provides a length of time for said valve assembly to be opened and closed at the end thereof.

7. The programmable flow control valve unit of claim 6, wherein:
   a. said automatic mode provides a means for carrying out a fluid flow sequence set by said program mode; and
   b. said repeat mode provides for duplicating of a fluid flow sequence for a day.

8. The programmable flow control valve unit of claim 7, wherein said manual mode provides for a one-shot timed fluid flow cycle.

9. The programmable flow control valve unit of claim 8, wherein said repeat mode accepts six different parameters from the user and then begins a fluid flow cycle which repeats daily until interrupted by the user or low battery.

10. The programmable flow control valve unit of claim 4 wherein said switch cam has the shape of a flattened mushroom.

11. The programmable flow control valve unit of claim 1 wherein an electronic circuit forms part of said electronic assembly for said programmable flow control valve unit to provide an operation function thereof, wherein:
 a. said electronic circuit includes a single chip microcomputer operably connected therein for carrying out all logic and timing functions;
 b. said electronic circuit includes a pushbutton assembly operably connected to said single chip microcomputer for allowing user input of data and commands;
 c. said electronic circuit includes a liquid crystal display operably connected to said electronic assembly to provide a readout of valve status and program data;
 d. said electronic circuit is operably connected to a timekeeping crystal for providing necessary timing functions for said device;
 e. said electronic circuit includes a valve control circuit operably connected to said single chip microcomputer for applying current to motor to operate said valve assembly;
 f. said electronic circit includes a battery means for supplying all power needed by said programmable fluid flow control valve; and
 g. said single chip microcomputer, said pushbutton assembly, said liquid crystal display, said timekeeping crystal, said valve control circuit, and said battery means are electrically and cooperatively interconnected.

12. The programmable flow control valve unit of claim 11 wherein said electronic circuit further includes a low battery sensing circuit for signaling said microcomputer when said batteries have ended their operating life to thereby prevent locking said programmable flow control valve in an open position.

13. The programmable flow control valve unit of claim 12 wherein:
 a. said motor rotates a gear assembly;
 b. said gear assembly operates a valve mechanism; and
 c. an electrical connection from said gear assembly to said single chip microcomputer signals a desired position for said programmable fluid flow control valve in order to provide instruction to said single chip microcomputer and thereby permit said motor to cease operation.

14. The programmable flow control valve unit of claim 13 wherein:
 a. said pushbutton assembly is electrically connected to said single chip microcomputer, said liquid crystal display, said motor, a set of leaf switches, and said battery means; and
 b. said pushbutton assembly includes a plurality of switches for activating said programmable flow control valve unit.

15. The programmable flow control valve unit of claim 14 wherein:
 a. said motor operates a switch cam;
 b. said switch cam operates a pair of said leaf switches; and
 c. said leaf switches feed information to said single chip microcomputer for signaling a valve position to said single chip microcomputer.

16. The programmable flow control valve unit of claim 15 wherein:
 a. a valve position sensing switch feeds a valve position to said computer;
 b. said valve position sensing switch adds or removes a least one transistor from operation as required;
 c. said signal is amplified and inverted by said first transistor thereby causing current to flow through said switch and a second base resistor of a second transistor resulting in application of current to said motor;
 d. said motor functions and turns a main shaft for a sufficient period of time to cause said first switch to have a change of state; and
 e. said change of state causes said second transistor to receive a high logic level, to thereby cease application of current to said motor.

17. The programmable flow control valve unit of claim 16 wherein:
 a. said valve actuator mechanism is closed by said microcomputer applying a low logic level to said base resistor of said second transistor through said first switch; and
 b. said first switch changes state to cause said second transistor to receive a high logic level from said first transistor thereby causing said motor to cease operation.

18. The programmable flow control valve unit of claim 17 wherein:
 a. a keyboard sense line connects each pushbutton switch in said push button switch assembly to said microcomputer and allows said microcomputer to sense closure of said pushbutton switch in said push button switch assembly;
 b. a switch cam operates said first switch and a second switch to signal said microcomputer when a main shaft of said programmable flow control valve unit has reached a desired position;
 c. said liquid crystal display is driven directly by said microcomputer to display information to a user of said programmable flow control valve unit;
 d. a plurality of capacitors provide for operation of said microcomputer; and
 e. a diode means provides for a constant current supply when said motor loads said batteries.

19. The programmable flow control valve unit of claim 1 wherein:
 a. said electronic assembly includes a low battery circuit and a quartz timing crystal for operating said programmable memory means;
 b. said clock mode allows entry of the current day of the week, current AM or PM status, and the current time;
 c. said program mode sets a program including which day of the week, AM or PM start time, and duration for said programmable flow control valve to operate;
 d. said repeat mode permits a repeat of said program in a one-step fashion;

e. said automatic mode causes said programmable fluid flow control valve unit to carry out a fluid flow sequence entered in said program mode until interrupted by said user or said low battery circuit; and f. said manual mode permits said programmable fluid flow control valve unit to be operated manually.

20. The programmable flow control valve unit of claim 19 wherein:

a. said programmable memory means is a single chip microcomputer;

b. said push button assembly is operably connected to control said five modes;

c. an enter means is operably connected for loading each of said five modes within said single chip microcomputer;

d. said repeat mode permits more than one repeat of said program;

e. said low battery circuit includes a means for rendering said low battery circuit stable with respect to variations in ambient temperature;

f. said push button assembly is operably connected to said single chip microcomputer;

g. said single chip microcomputer is connected to a readout means; and h. said readout means indicates both time of day and a program parameter at the same time.

* * * * *